INVENTOR.
EDWARD W. MAASS
BY
Porter, Chittick & Russell
ATTORNEYS

Aug. 14, 1962  E. W. MAASS  3,048,891
BLOW MOLDING MACHINE AND PROCESS
Filed Aug. 26, 1960  4 Sheets-Sheet 2

INVENTOR.
EDWARD W. MAASS
BY
Porter, Chittick & Russell
ATTORNEYS

Aug. 14, 1962 E. W. MAASS 3,048,891
BLOW MOLDING MACHINE AND PROCESS
Filed Aug. 26, 1960 4 Sheets-Sheet 3

*INVENTOR.*
EDWARD W. MAASS
BY
Porter, Chittick & Russell
ATTORNEYS

Aug. 14, 1962  E. W. MAASS  3,048,891
BLOW MOLDING MACHINE AND PROCESS
Filed Aug. 26, 1960  4 Sheets-Sheet 4

INVENTOR.
EDWARD W. MAASS
BY Porter, Chittick & Russell
ATTORNEYS

United States Patent Office 3,048,891
Patented Aug. 14, 1962

3,048,891
BLOW MOLDING MACHINE AND PROCESS
Edward W. Maass, 114 Park St., Manchester, Conn.
Filed Aug. 26, 1960, Ser. No. 52,179
6 Claims. (Cl. 18—5)

This invention consists in an improved method and apparatus for blow molding hollow articles such as spools, multiple-cored potting forms, sectional tubing, containers, toy animals, and various other cored objects.

The familiar wooden spool, for example, long a commercial staple for exhibiting and selling, wound thereon, thread, tape, string, and fish line, among other things, has in recent years become hard to obtain in suitable grade at low cost. Plastic, paper and metal substitutes have been tried without complete success in meeting the several stringent requirements of a satisfactory successor, which should be competitive in cost to wood, light, mechanically strong, capable of being notched to hold an end of thread, capable of being labeled and marked for ordinary commercial purposes, easily produced, and wound, mounted and usable for dispensing in the customary way. Present plastics technology has gone far towards developing a suitable product, but at the cost of difficult, complex, and expensive tooling, molding, and secondary (finishing and assembly) operations which have been necessary to any plans for a large volume production, especially when it has been desired to form and incorporate into the spool a reinforcing core. Such complexity has entailed, in addition to the mechanical shortcomings and costs of the actual formation of the spool, wear and tear on many machine parts, considerable maintenance and cleaning, and relatively short component life.

A principal object of this invention is, therefore, the efficient production, in volume, of a mechanically satisfactory plastic spool with an integrally-molded plastic reinforcing core, at a competitive cost and with a minimal initial investment.

Other principal objectives of my invention include the economical simplification of the construction and arrangement of producing components, their physical improvement, and the improvement of the thereby-manufactured spool. Further, my conception is designed to produce completely finished objects usable or packable immediately upon ejection from the mold, except for such particularized touches as marking and labeling. Color for any purpose can be incorporated into the plastic material itself. I also intend to provide a novel apparatus and process applicable both to components and devices already known, and to such as may be developed; and which will both operate on a repeating cycle as concerns the parts and steps I here envision, and will also be found appropriate for incorporation into a larger automated system, making use of appropriate conveyor and processing instrumentalities external to my invention, for example, a system starting with the making of the molding materials to be used and ending with the final wrapping of the thread or tape on the spool.

I further intend that this invention shall furnish novel means, satisfying the foregoing ends, which will produce a competitively superior spool in strength, lightness, adaptability, and cost, in which appropriately shaped coaxially aligned diametrically opposed coring pins or members, and proper forming materials, all in one movement of the cycle and device here disclosed, provide a reinforcing unobstructedly hollow, cored template in support of the external structure of the said spool or other article, cause the molten surface thereof to press against and be pierced by a needle, thereby facilitating the blowing process, and simultaneously furnish means for the escape of fluid trapped by the closing of the mold between the molten plastic and the wall of the mold cavity. Another comprehended improvement is the inclusion in my device and process of appropriately shaped and linked cutting lips or edges, mold block face channels, and mold block outer end-face openings for, and for the timed control of, severing, confining, and removing, from the molding apparatus, waste molten plastic caught at the closing of the mold outside the edges of the mold cavity and between the opposed faces of the mold block (called, in the industry, "flash").

In one presently-preferred embodiment of my invention, I provide an extruded plastic tube shell, larger, in its largest diameter when flattened somewhat between the said opposed mold block faces, than any parallel cross-section of the mold cavity, so that the "flash" described above is pinched off by cutting lips or edges all around the said cavity, which lips or edges conform to the outline of the said article to be formed.

Moreover, in another preferred embodiment, my process and device are contrived to provide, by the same means by which and at the very moment when a portion of plastic tube shell to be molded during a given cycle is severed from an extruded source tube shell and sealed, a sealed end for the said source tube shell, to prepare the latter for further extrusion for the next blow-molding cycle, and to furnish during that cycle a convex, air-retaining bubble of severed and sealed plastic tube shell, which may the more easily be forced against the blowing needle mentioned above and described later in more detail.

In still another preferred embodiment, I provide a blow-pipe means for forcing air into an open end of a shell or tube portion of extruded plastic, this means replacing the blowing-needle piercing means mentioned above, and cutting means for providing the said shell or tube portion of plastic with an open end at the beginning of each molding cycle, in place of the previously described sealed end.

Materials suggested for forming the spools or other article include as examples various commonly marketed kinds of thermoplastics, such as the various copolymers of polyethylene, cellulosics (e.g., acetate or butyrate), polyamids (e.g., nylon), and the various forms and blends of polystyrene and its copolymers. This list is, of course, in no way intended to exclude the use or consideration of other appropriate kinds of materials which are or may become available.

Remaining objects, features, and functions of my apparatus and process will appear from the following description of one preferred embodiment thereof, illustrated by the accompanying drawings, wherein.

Figure 4:
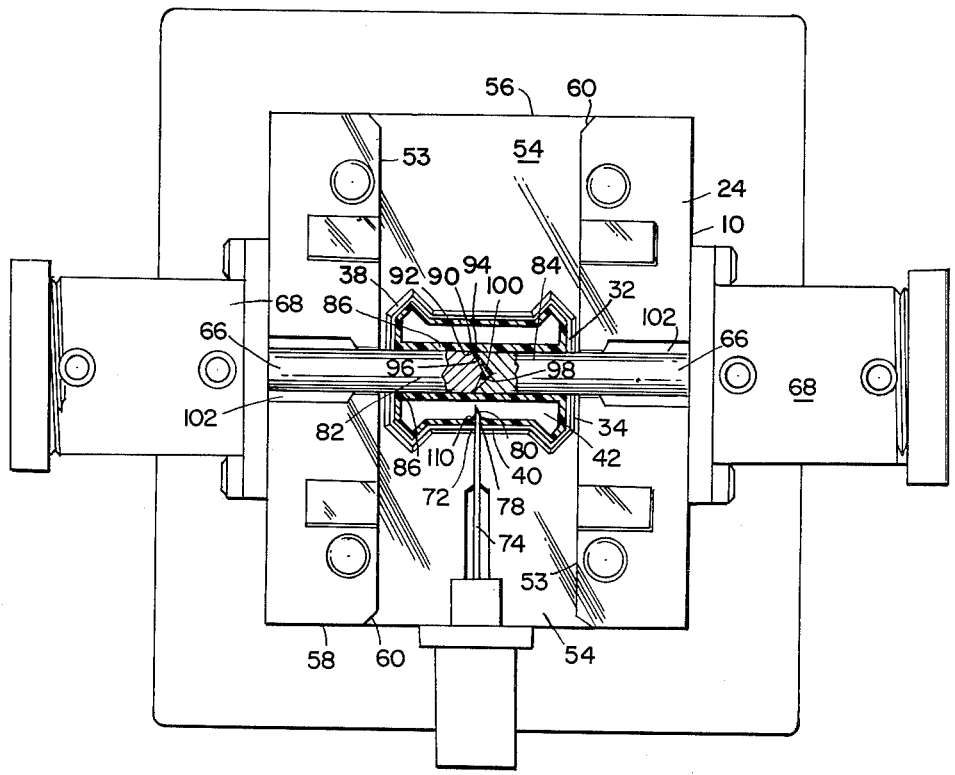
FIG. 4 is a cross-sectional front end view, taken along a vertical plane through the principal axis of the spool-molding cavity of the mold block, after the coring pin ends have come together and the piercing needle has entered the sealed tube or shell portion permitting the entrance thereinto of blown fluid resulting in the forcing of the plastic into the shape of the molding cavity.
Figure 6:
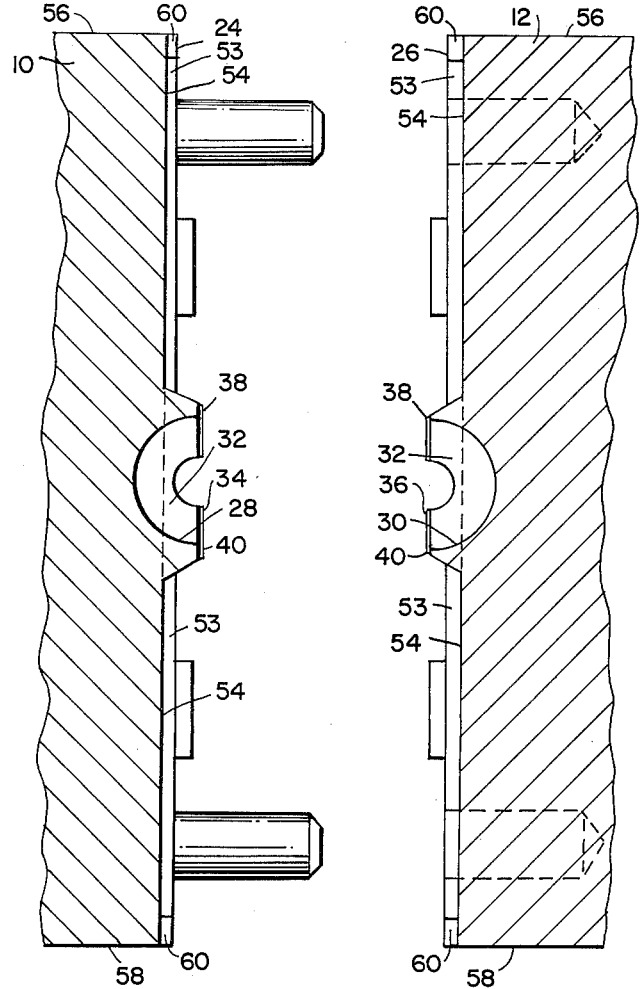
Figure 7:
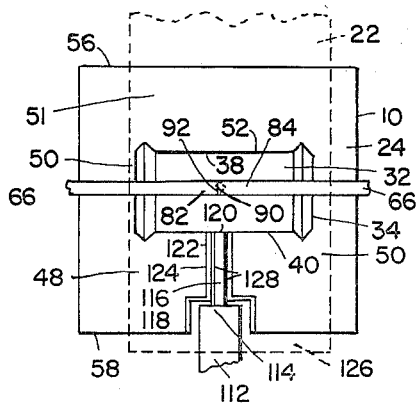

FIG. 6 is a cross-sectional side view of the mold block faces, taken along a plane through the center of the mold cavity and perpendicular to its principal axis, showing in detail the lead pins and sockets for mating the two opposed block faces, the mating pads, the cutting lips or edges forming the upper and lower edges of the molding cavity, the flash channels, and the shape of the interior of the said cavity itself; and FIG. 7 is a schematic front view, taken along a vertical plane through the principal axis of the mold cavity, of an alternative embodiment to that disclosed in FIG. 4, showing the use of blow-pipe means in place of the blowing needle, and the enveloping of the said blow-pipe means by an end of the extruded plastic tube shell.

Figure 1:
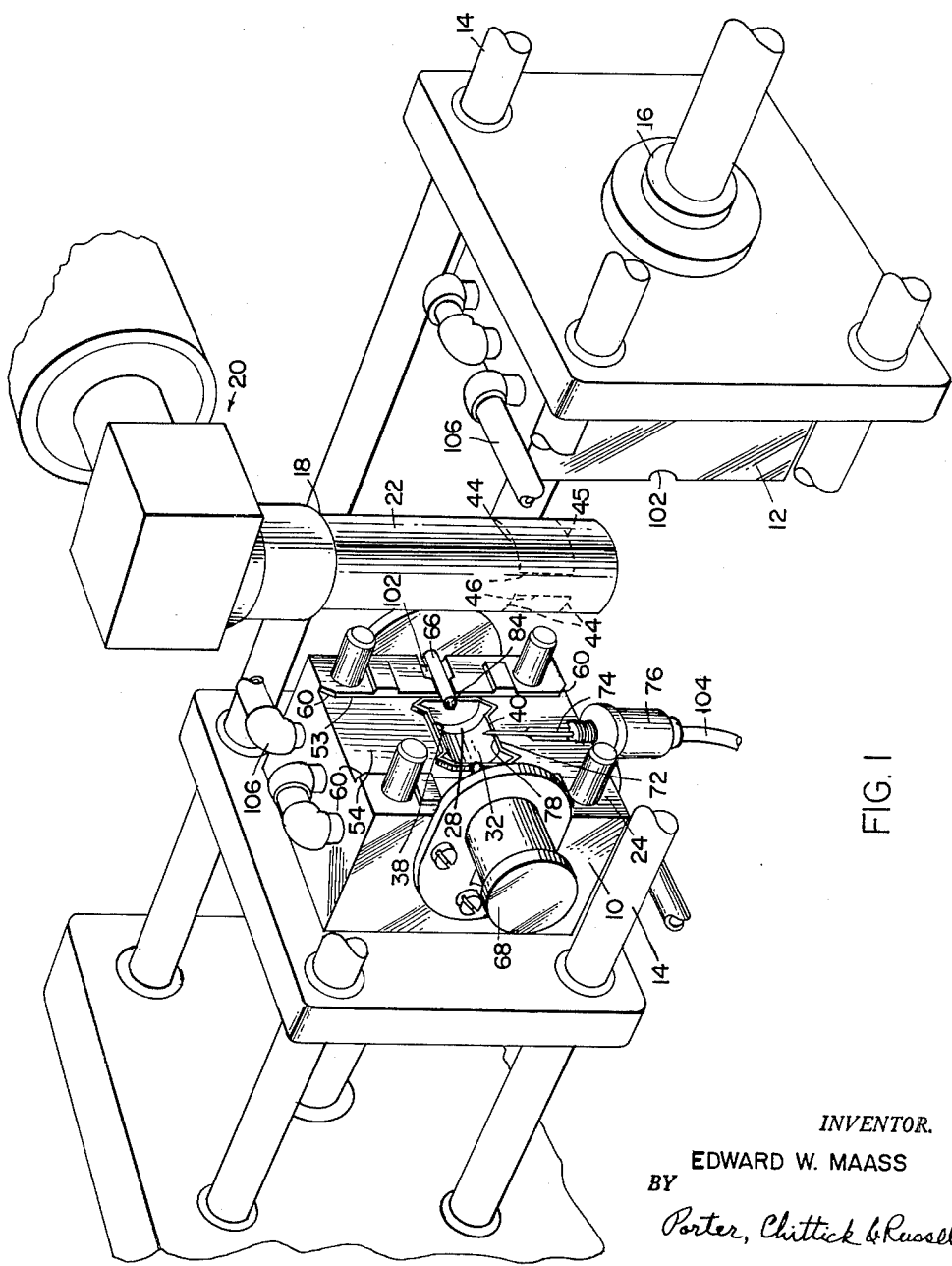
FIG. 1 is a perspective view of my mold at the beginning of the molding cycle, showing its cavity halves open and surrounding a tube shell of plastic material being extruded from a suitable die head.

Referring now to the said drawings, and in particular to FIG. 1, in the accomplishment of the foregoing and other objects, in one preferred embodiment of my invention, I provide two mold block halves 10, 12 mounted for sliding apart and together on horizontal rods 14, which are in turn set into a vertically tracked frame (not shown) for upward and downward motion. This frame is driven up and down in its track by hydraulic cylinders, not shown but similar to other hydraulic cylinders 16 which propel the said mold block halves 10, 12 in opposite directions along the rods 14 to open and to closed positions thereon. These horizontal and vertical courses are timed with respect to each other, and form part of the molding cycle to be described.

The said molding cycle begins with the mold block halves 10, 12 apart from each other, and with the frame supporting the rods 14, on which they ride, at its upmost position on its track. Centered above and between the said halves 10, 12 is a die head ejection opening 18 in a device, indicated generally at 20, of a standard machine of any type or manufacture currently suitable for forming and emitting a thin-walled hollow tube or shell 22 of molten plastic, which is extruded by being pushed out by the screw (not shown), of the extruder 20 and thereafter descends under gravity between opposed faces 24, 26 of the respective mold block halves 10, 12.

As shown in FIG. 6, the opposed faces 24, 26 are contoured to furnish respective wall halves 28, 30 of a mold cavity 32 of the size, shape, and orientation of a spool having its axis in the horizontal plane, respective specially-shaped cutting lips or edges 34, 36 including respective upper portions 38 thereof and respective lower portions 40 thereof, of the said cavity halves 28, 30 being designed to mate upon being brought together, forming the said spool molding cavity 32.

Figure 2:
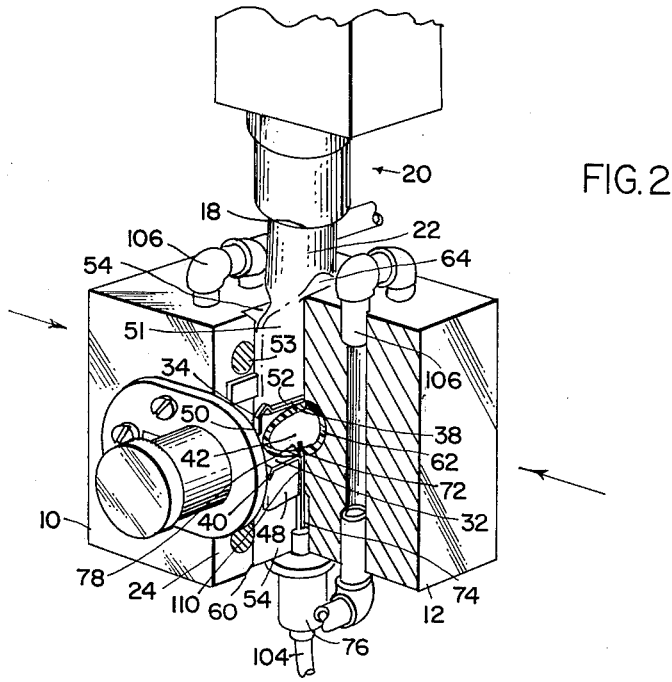
FIG. 2 is a perspective cut-away view of the mold block upon the closing of its halves as they cut off and seal, a portion of plastic tube shell to be molded, and of the structure of piping set into the said mold block halves outside the mold cavity for controlling the temperature of the block and rigidifying the molded spool.
Figure 3:
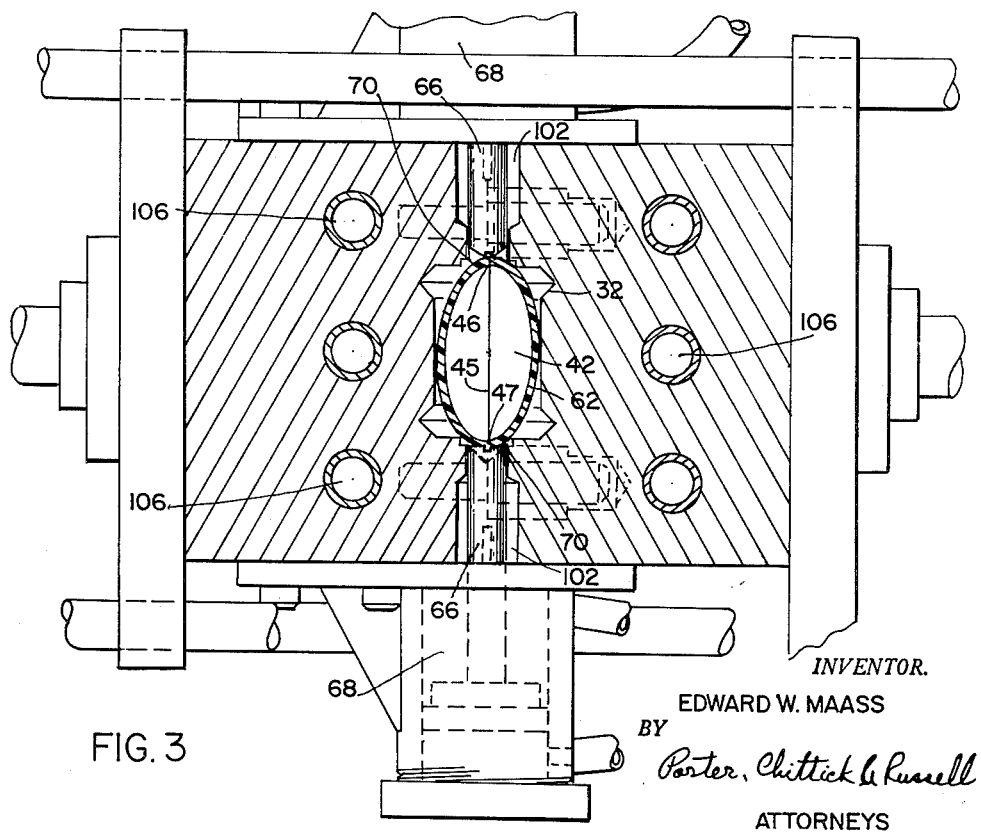
FIG. 3 is a cross-sectional plan view of the mold block in its supporting braces, taken along a horizontal plane through the principal axis of the spool-molding cavity just before the entrance of the coring pins or members into the plastic tube or shell portion sealed within the said mold cavity.

When a length of the tube or shell 22 has reached the lower lip pair 40 of the molding cavity wall halves 28, 30, the mold block halves 10, 12 are driven by means of the hydraulic cylinders 16 to close on it. Simultaneously, by means of the specially shaped lip pairs 34, 36, parts of a shell portion 42 of the tube 22 (shown in FIGS. 2 and 3) are severed therefrom; end edges 44, 45 and side edges 46, 47 thereof (shown in FIGS. 1 and 3) are sealed together in the cutting; the said sealed shell portion 42 is confined entirely within the molding cavity 32 formed at the closing of the mold block halves 10, 12 and the meeting of the said lip pairs 34, 36; respective lower, side, and upper portions 48, 50, 51 of excess plastic material (called "flash" in the industry) outside the lips 34, 36 (shown in FIG. 2) are cut away; and an open end 52 of the tube 22 on the upper side of the upper severing lips 38 (shown in FIG. 2) is formed.

The flash portions 48, 50 and 51 of the tube 22, caught outside the molding cavity 32 and between the closed mold block faces 24, 26 are, of course, flattened in the impact. They are confined between shoulders 53 and the pairs of cutting lips 34, 36 forming the parting line of the spool molding cavity 32 in channels 54 set into and running down the said mold block faces 24, 26 and terminating at a top 56 and a bottom 58 of the mold block halves 10, 12 in slightly enlarged openings 60.

When the mold block halves 10, 12 open, the respective lower and side portions 48, 50 of flash, severed by the cutting lips 34, 36, fall from the mold bottom 58 and are reclaimed (by external means not shown) to make new plastic for the extrusion device 20.

The frame supporting the rods 14 carrying the mold block halves 10, 12 is now driven down its vertical track by the hydraulic cylinders previously mentioned (though not shown), while the extrusion device 20 and its die head opening 18 remain fixed in their external supporting means (also not shown). The increasing vertical space between the said extruder head opening 18 and the descending closed mold block halves 10, 12 is either filled by an appropriately timed continuous extrusion of the molten plastic tube 22 whose thin wall 62 (shown in FIG. 3) will be closed upon and cut off above the upper flattened part 64 thereof (shown in FIG. 2) as just described, by the then-open mold cavity lips or edges 40 at the beginning of the following cycle; or the said space is not filled until just before the beginning of that cycle, the extrusion of plastic being in that event timed in a discontinuous way.

Figure 5:
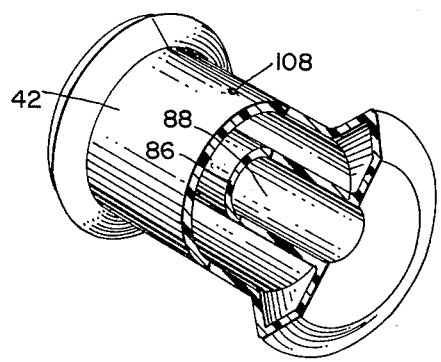
FIG. 5 is a perspective cut-away view showing the structure of a finished spool made by my apparatus and process.

As the closed mold descends, coring pins 66 are forced by suitable external means such as the air driven cylinders 68 into diametrically opposed regions 70 of the thin wall 62 of the shell portion 42 of the plastic tube 22 sealed within the cavity 32, the thin plastic draping itself loosely over their surfaces as they advance towards each other, somewhat compressing the air (or other fluid which may have been introduced into the molding apparatus) trapped within the said sealed shell portion 42 at the time of the closing of the mold block halves 10, 12. This compression forces the shell wall 62 against the wall region 72 of the mold cavity 32 wherein a hollow blowing needle 74, retractably controlled by means of an air cylinder 76 and which has entered the said wall 72 through a passage 78 therein (shown in FIGS. 1, 2 and 4) is easily made (typically but not essentially by a sudden push) to penetrate the said shell wall 62 so that an appropriately shaped piercing and blowing tip 80 thereof (shown in FIG. 4) extends into the hollow interior of the said shell portion 42, short of contact, however, with the coring pins 66, adjacent ends 82, 84 of which, having by this time approached each other closely at the center of the mold cavity 32, now meet, seal together the opposing regions 70 of the shell wall 62 into a reinforcing template 86, providing therein a right cylindrical, unobstructedly hollow core 88 as shown in FIGS. 4 and 5. The coring pin end 82 is pointed thickly so as to press the shell wall region 70, upon which it is made to impinge, inward, instead of merely to pierce it. The coring pin end 84 is conically notched, with an outer rim 90 constructed to mate upon contact with a slightly obtusely-angled shoulder edge 92 of the end 82 (as shown in FIGS. 4 and 7). The inner surface of the notched end 84 is formed so that upon the mating of the edge 92 with the rim 90 a space 94 remains between surfaces 96, 98 of the respective said ends 82 and 84, which there confine a small segment 100 of plastic, severed from the said shell wall 62 by the contact of the mating rim 90 and the shoulder edge 92.

The coring pins 66 are moved by air cylinders 68 through loosely-fitting bushings 102 set in the mold block halves 10, 12. When the said pins 66 enter the wall 62 of the plastic shell portion 42, the previously-described plastic portions loosely draped on the said pins 66 thereby form respective tunnel extensions (not shown) from the said bushings 102 (shown in FIG. 4), collect air formerly entrapped between the said shell wall 62 and the walls 28, 30 of the mold cavity 32 and evacuate it under pressure through the bushings 102, which provide the only avenue of escape.

The blowing now takes place. Air from a supply tube 104, shown in FIGS. 1 and 2, enters the interior of the sealed plastic shell portion 42, at a predetermined pressure depending on such factors, among others, as the operating temperature, and the type and plasticity of the molding material, through the tip 80 of the hollow needle 74. This short but continuous blast forces the cored plastic shell wall 62 to conform to the contours of the mold cavity 32 since the air pressure equalizes in all directions. The cored reinforcing template 86, which forms part of the wall 62, is made to conform similarly with the outer surfaces of the right cylindrical pins 66.

A coolant, such as water, controllably maintained at a suitable temperature, has meanwhile been circulating continuously at a controlled rate of flow, through a piping system 106 set into the mold block halves 10, 12, which are constructed of thermoconductive material. The consequent cooling of the mold cavity 32 cools and thereby rigidifies the plastic shell wall 62 conforming to its contours, transforming the molten shell portion 42 into a hardened spool 42, shown in FIG. 5.

As soon as enough time has elapsed for this rigidification to take place, the coring pins 66 are retracted by the air cylinders 68, the air blown into the spool interior is exhausted to atmosphere by reversing the flow thereof through the hollow needle 74 from the cylinder 76, and the said needle 74 is withdrawn by the said cylinder 76 from the mold cavity 32, leaving a small hole 108 in the side wall 62 of the spool 42, which maintains the equilibrium of air pressure within and without the said spool 42. By any of many known means incorporated into my invention at this stage, the hole 108 may be sealed, and the air within the spool fixed at a predetermined pressure.

By this time, the previously descending closed mold block halves 10, 12 have reached the nadir of their track, and they open, ejecting the finished spool 42 and the flash portions 48, 50 from the mold halves 10, 12, and the small severed plastic segment 100 from the template core 88; which actions are aided by the reblowing of air into the now open cavity 32 from the supply tube 104 and by the pulling of the spool 42 and the flash portions 48, 50 by other flash 110 which clings to the blowing needle 74 upon its retraction (shown before the said retraction in FIGS. 2 and 4).

As they eject the spool, the mold block halves 10, 12 now move up to their original position shown in FIG. 1, the cavity halves 28, 30 thereof surrounding a newly extruded plastic tube or shell 22 above the flattened part 64 of the previously extruded tube or shell. The block halves 10, 12 may be made to reach their fully open position at the beginning of, during, or immediately at the end of, their upward motion. The foregoing cycle is then repeated.

Of course, many alternative forms of my invented apparatus and process may be constructed.

In one alternative preferred embodiment, for example, the cutting lip pairs are restricted to the mold cavity edge portions 38, 40, the remainder of the mold cavity edges 34, 36 not being formed for cutting. The extruded plastic tube or shell 22 used is smaller in every diameter, even when flattened, than a parallel cross-section of the mold cavity 32 through its center. When the extruded plastic is in the shape of a right cylindrical tube or shell 22, the severed portion 42 thereof is, in this embodiment, also a right cylindrical tube or shell: only the end edges 44, 45 are severed, and so need be sealed, in the cutting; and there are no side flash portions 50. Only a lower portion 48 of flash has to be cut away from the tube or shell 22 at the closing of the mold block halves 10, 12. The lower end edge 52 of the tube or shell 22 on the upper side of the upper severing lips 38 is sealed, by the appropriate shaping of the said lips 38, in the same movement in which the upper end edges 44 of the shell portion 42 are severed and sealed together by them.

This feature is necessary in order that the shell portion 42 severed and sealed in the second and in all subsequent cycles be of sufficient convexity and retain enough of its original air so that it can be forced easily against the hollow air-blowing needle 74. The shoulders 53 of the flash channels 54 in this embodiment, terminate at the interior of the mold block faces 24, 26 in, and are bounded by, the respective ends of the cutting lip pairs 38, 40.

As this alternative device and operation have thus far been described, in practice the shell portion 42 produced in the first operating cycle may form a fairly limp bubble within the mold cavity 32; for, although the wall 62 of the shell portion 42 is thin, and although its end edges 44, 45 are pinched together quickly, it nevertheless tends to retain its right cylindrical structure during the severing of the said end edges 44, 45 and to yield only slightly to the curving and distortion of its shape required by their sealing together. This tendency to remain cylindrical is hardly countered by the existence, up to the final moment of sealing, of easy avenues of escape, in either open end edge 44, 45 for any air originally within the said shell portion 42, to the extent that such air may begin to undergo compression by the closing together of the said wall end edges 44, 45.

A shell portion 42 produced in the second and subsequent molding cycles in this embodiment will not have two pairs of end edges 44, 45 available for the escape of internal air. The upper end edge 44 will, as before, be cut and simultaneously sealed only in the closing of the lips 40 described above, the lower end 52 now becoming the lower end edge 45 of the plastic tube or shell 22, having been already sealed in the previous cycle. Thus, air under compression could escape only from the upper end 44 of the portion 42 being sealed, which leads only to the confined space within the tube or shell 22 immediately below its extrusion die head opening 18; and a comparatively fat bubble will result.

It may be noted in passing that, if desired, the first shell portion 42 could be made to form a relatively fat bubble by the simple expedient of sealing shut, for example by manual means, the part 64 of the plastic tube 22 below the cutting lips 40, before the coming together of the mold block halves 10, 12.

In another alternative preferred embodiment, my invention comprises the apparatus and process first described above, but having in place of the blowing needle means a blow-pipe means 112, as shown in FIG. 7, centered below the mold block with a blowing end 114 upward, and a passage 116 formed of contoured halves in each of the faces 24, 26 of the respective mold block halves 10, 12 extending from the bottom 58 of the said mold block to the mold cavity 32, the bottom opening 118 of the said passage 116 being shaped to receive and confine loosely the blowing end 114 of the said blowpipe means 112, and the opening 120 of the said passage 116 in the wall region 72 of the mold cavity 32 being small with respect to the said bottom opening 118. The edges 122 of the mold block face halves of the said passage 116 have cutting and sealing lips 124 similar to the lips 34, 36. The outside diameter of the blowpipe means 112 is less than the inside diameter of the extruded tube or shell 22 of organic plastic being used.

In this embodiment, the lower open, end 126 of the said tube or shell 22 is allowed to envelop the blowing end 114 of the blowpipe means 112. The mold block halves 10, 12 then close upon both blow pipe means 112 and plastic tube or shell 22. A tube 128 of the plastic is thereby formed, extending from the mold cavity opening 120 down to the blowing end 114, connecting the interior of the plastic shell portion 42 within the mold cavity 32 with the interior of the blowpipe means 112. Any of many presently-known and available means may be used to sever this connecting tube 128 from the formed spool 42 after the latter has been sufficiently rigidified, at or before its ejection from the mold.

In still another preferred embodiment, two thin plastic sheets are extruded between the opposed faces 24, 26 of the mold block halves 10, 12, the width of each sheet exceeding the longest parallel dimension of the mold cavity 32, and the separation of the sheets being sufficient either to permit the reception between the said sheets of the blowing end 114 of the blowpipe means 112, as previously described, or to permit the sheets to be shaped by appropriate means into complementary pieces of, in general, a convex, or in particular, a tubular shell, the molding process then proceeding utilizing the blowing needle means as described originally above.

Further, the drawings show both air cylinders 68 used to move the coring pins 66 mounted on the same mold block half 10. Each may be mounted on a different half. Furthermore, I have so far shown only one spool cavity per mold block half, and only one mold block per extruder die head opening; my conception also comprehends providing more than one cavity per mold, and more than one mold block per extruder die head opening, properly spaced, the steps relating them being properly timed. Portions of the mold cavity edge cutting lips 34, 36 could similarly be set in alternative block halves. Pre-cut lengths of soft plastic tubing conveyed by known means to my apparatus may be used in lieu of the extrusion process heretofore described; or other than simple right cylindrical tubing may be extruded and used. The rigidification of the spool can be accomplished by use of a setting composition, or by chemical means, rather than by cooling as described, if a suitable setting composition, chemical means, or other molding material than thermoplastic becomes available in the future.

The flow of coolant can be intermittent, timed to conform to the blowing cycle, rather than continuous as heretofore disclosed. Mechanically operated pin means can be used to assist the ejector action at the end of each cycle; flying knife or other cutting means can be provided above or below the mold to provide the open end 52 of extruded tube or shell before each cycle. The extrusion may be other than vertical and the motion of the mold block halves 10, 12 other than horizontal. More than one pair of diametrically opposed coaxially aligned coring pins 66 per mold cavity 32 can be provided; or a single pair might be so made to move in one such cavity 32 as to form more than one reinforcing cored template 86 in the article being molded therein. Moreover, in the formation of any core 88 and reinforcing template 86, only one in each pair of the said pins 66 need be elongated in shape and made to enter the plastic shell wall 62; the opposed pin being comparatively short; and its coring end being either stationarily positioned just at, or being moved to, but not into, the diametrically opposed part of the outer surface of the said wall 62, where the two aligned coring pin ends 82, 84 may then be made to meet in a coring and sealing action like that previously disclosed above.

Finally, the mold block can be formed of three or more mating sections, provided with suitable means for movement, rather than of two halves, as in the first-described preferred embodiment. This will permit more complex parts of varied shape, for example, undercuts, to be molded easily, and the article comprising them to be removed easily from the mold after being formed.

I realize that many other modifications will be apparent to those skilled in the pertinent art. The invention, herein disclosed, therefore, is not to be construed as limited, but is to be understood as being capable of being broadly practiced within the full spirit of the appended claims, except to any extent necessitated by the prior art.

I claim:

1. Blow molding apparatus for forming hollow articles from organic plastic material, said apparatus including a base, a sectional mold block mounted on said base, means for controlling the movement of each section of said block, means for depositing a plastic extrusion within a cavity of said mold sections, means on said sections for sealing one end of said plastic extrusion, means for deforming inwardly mid-sections of opposed end portions of said plastic extrusion so they meet in abutting relationship, means for blowing fluid under pressure into said extrusion to form a shape conforming to the configuration of a cavity of said mold sections means for circulating a coolant through said mold to cure the article therein, and means for removing the article from said sectional mold block.

2. Blow molding apparatus for forming hollow articles from organic plastic, said apparatus including, a sectional mold block, means for opening and closing the mold block, means for depositing a plastic extrusion having a tubular configuration between sections of said mold block, means on said mold block to sever and seal one end of said tubular extrusion within said mold, means for inserting diametrically opposed core members into mid sections of opposed end portions of said tubular extrusion to form them inwardly into abutting relationship to define a concentrically disposed support, the action of said core members simultaneously deforming the exterior of said tubular extrusion into proximate engagement with the interior of said mold, means for evacuating fluid within said plastic extrusion, means for blowing fluid under pressure into said extrusion, means for circulating a coolant medium through said mold and means for removing the article from the mold.

3. Blow molding apparatus as set forth in claim 2 where said means for blowing fluid under pressure into said extrusion comprises a hollow needle having a piercing tip portion, compression means to control movement of the needle, said needle having one end thereof connected to an external source of fluid under pressure.

4. A method of blow molding articles from organic plastic material comprising the steps of, forming a thin walled convex shell of the said material, severing and sealing the edges of a portion thereof by pinching together to form a bubble within a mold cavity, forcing at least one elongated member through the mid section of one end of said bubble to form a hollow reinforcing core, introducing fluid under pressure into the interior of said bubble to deform it outwardly against the cavity mold, curing said molded article, withdrawing said elongated member from the molded article and ejecting the article from the mold.

5. A method of blow molding articles from organic plastic material comprising the steps of, positioning a tubular extrusion within the cavity of a sectional mold, severing and sealing the edges of the extrusion by pinching together to form a bubble, deforming the mid sections of end portions of said bubble inwardly to form a hollow reinforcing core, introducing fluid under pressure into said bubble to force it into a predetermined configuration within said mold cavity, curing the molded article and ejecting the molded article from the mold.

6. A method of blow molding articles from organic plastic material comprising steps of, forming a thin walled convex shell of the said material, severing and sealing the edges of said shell by pinching within the cavity of a mold block to form a bubble, inserting diametrically opposed elongated members into the mid portion of end sections of said bubble, deforming said end sections inwardly into abutting relationship to form a hollow core of said bubble, introducing fluid under pressure into said bubble to force the wall thereof into engagement with the interior of the cavity of said mold and to conform to the configuration thereof, withdrawing said opposed elongated member from within said core and ejecting the molded article from the mold.

References Cited in the file of this patent

UNITED STATES PATENTS

| | | |
|---|---|---|
| Re. 23,564 | Hobson | Oct. 14, 1952 |
| 2,331,702 | Kopitke | Oct. 12, 1943 |
| 2,349,177 | Kopitke | May 16, 1944 |
| 2,579,399 | Ruekberg | Dec. 18, 1951 |
| 2,918,698 | Hagen et al. | Dec. 29, 1959 |
| 2,951,264 | Bailey | Sept. 6, 1960 |
| 2,991,500 | Hagen | July 11, 1961 |
| 3,004,285 | Hagen | Oct. 17, 1961 |